(12) United States Patent
Dunn et al.

(10) Patent No.: US 9,015,205 B2
(45) Date of Patent: *Apr. 21, 2015

(54) IDENTITY MANAGEMENT USER EXPERIENCE

(75) Inventors: Melissa W. Dunn, Woodinville, WA (US); Marcus Harvey, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 404 days.

This patent is subject to a terminal disclaimer.

(21) Appl. No.: 13/243,701

(22) Filed: Sep. 23, 2011

(65) Prior Publication Data

US 2012/0016903 A1 Jan. 19, 2012

Related U.S. Application Data

(63) Continuation of application No. 11/093,068, filed on Mar. 29, 2005, now Pat. No. 8,032,562.

(51) Int. Cl.
*G06F 17/30* (2006.01)
*G06F 21/62* (2013.01)

(52) U.S. Cl.
CPC ................... *G06F 21/6245* (2013.01)

(58) Field of Classification Search
USPC ........... 707/999.001–999.206, 802, 803, 804, 707/805
See application file for complete search history.

(56) References Cited

U.S. PATENT DOCUMENTS

| | | | |
|---|---|---|---|
| 5,765,171 A * | 6/1998 | Gehani et al. ...................... | 1/1 |
| 6,671,699 B1 | 12/2003 | Black et al. | |
| 7,222,078 B2 | 5/2007 | Abelow | |
| 7,680,819 B1 | 3/2010 | Mellmer et al. | |
| 7,958,546 B2 * | 6/2011 | Kaplan ............................. | 726/6 |
| 8,117,649 B2 * | 2/2012 | Hardt ................................ | 726/6 |
| 8,200,700 B2 * | 6/2012 | Moore et al. .................... | 707/791 |
| 2001/0027472 A1 * | 10/2001 | Guan ............................. | 709/203 |
| 2002/0174188 A1 * | 11/2002 | Clark et al. ..................... | 709/213 |
| 2003/0018513 A1 * | 1/2003 | Hoffman et al. ................ | 705/10 |
| 2003/0028412 A1 | 2/2003 | Hoffman et al. | |
| 2004/0093317 A1 * | 5/2004 | Swan .................................. | 707/1 |
| 2005/0004985 A1 * | 1/2005 | Stochosky ..................... | 709/205 |
| 2005/0044152 A1 * | 2/2005 | Hardy et al. .................. | 709/206 |
| 2005/0091272 A1 * | 4/2005 | Smith et al. ................. | 707/104.1 |
| 2006/0224611 A1 | 10/2006 | Dunn et al. | |
| 2007/0038610 A1 * | 2/2007 | Omoigui ............................ | 707/3 |
| 2007/0106781 A1 * | 5/2007 | Hancock et al. ............... | 709/223 |
| 2010/0211515 A1 * | 8/2010 | Woodings et al. ............. | 705/320 |

OTHER PUBLICATIONS

U.S. Appl. No. 11/093,068, Jun. 26, 2007, Office Action.

(Continued)

*Primary Examiner* — Hosain Alam
*Assistant Examiner* — Ahmed Abraham
(74) *Attorney, Agent, or Firm* — Jim Banowsky; Leonard Smith; Micky Minhas

(57) ABSTRACT

Upon requesting to share one or more types of identity information, a user is automatically presented with an interface through which the user can interact in selecting an amount of identity items to share. A subset of the total identity items selected may then be shared with specified entities. Interfaces can also be used to assist the user in managing identity information that has been shared with others by providing the user with a visual list of entities for which the user has shared specified identity information and to whom updated information can be sent.

20 Claims, 6 Drawing Sheets

(56) References Cited

OTHER PUBLICATIONS

U.S. Appl. No. 11/093,068, Jul. 9, 2008, Office Action.
U.S. Appl. No. 11/093,068, Jun. 1, 2009, Office Action.
U.S. Appl. No. 11/093,068, Sep. 23, 2009, Office Action.
U.S. Appl. No. 11/093,068, Mar. 19, 2010, Office Action.
U.S. Appl. No. 11/093,068, Jul. 23, 2010, Office Action.
U.S. Appl. No. 11/093,068, Dec. 20, 2010, Office Action.
U.S. Appl. No. 11/093,068, Jun. 14, 2011, Notice of Allowance.

* cited by examiner

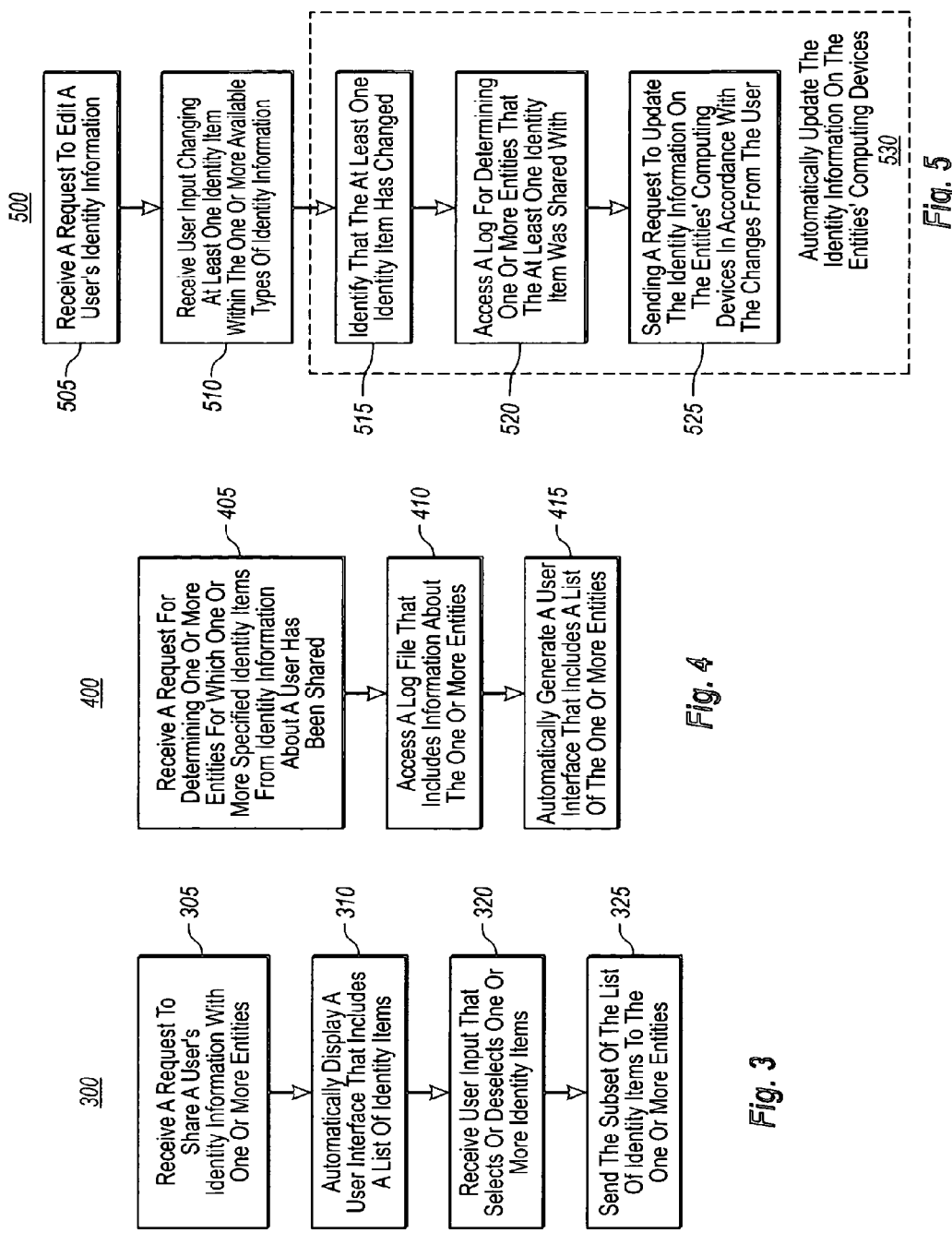

IDENTITY MANAGEMENT USER EXPERIENCE

CROSS-REFERENCE TO RELATED APPLICATIONS

This application is a continuation of U.S. patent application Ser. No. 11/093,068 filed on Mar. 29, 2005 and entitled "IDENTITY MANAGEMENT USER EXPERIENCE," which application is hereby expressly incorporated herein in its entirety.

BACKGROUND OF THE INVENTION

1. The Field of the Invention

The present invention generally relates to managing a computer user's identity information. More particularly, the present invention provides systems, methods, and computer program products for assisting a user in managing the user's shared persona on a request-by-request basis. In addition, the present invention provides the user with the capabilities to log, and later determine, entities for which the user's identity information is shared.

2. Background and Related Art

Computerized systems provide many advantages towards peoples' ability to perform tasks. Indeed, the computer system's ability to process information has transformed the way we live and work. Computing systems now take a wide variety of forms including desktop computers, laptop computers, tablet PCs, personal digital assistance (PDAs), and the like. Even household devices (such as refrigerators, ovens, sewing machines, security systems, and the like) have varying levels of processing capability and thus may be considered computing systems. Processing capabilities continue to be incorporated into devices that traditionally did not have such processing power. Accordingly, the diversity trend of computing systems will likely increase.

Along with computing systems, the Internet has revolutionized the way people communicate and has ushered in a new era in human history often termed the "information age." In essence, the Internet includes a large constellation of networked computers that are spread out over much of the world. Sophisticated computers, software, and networking technology have made communication over the Internet fairly straight forward from the view point of the end user.

With the advent of the Internet, electronic messaging systems (e.g., email, messaging boards, instant messaging (IM), chart rooms, secured transactions, online shopping, etc.) have become an increasingly popular way to communicate information. For example, businesses increasingly rely on electronic messages to share ideas, transmit documents, schedule meetings, and perform a multitude of other everyday tasks. Further, individuals utilize messaging systems to communicate and interact with family, friends, business associates, acquaintances, Internet sites, or any other desired individual or organization within one's interactive community. Accordingly, such electronic messaging systems have expanded the notion of a community far beyond any particular geographical location.

Within such interactive communities, often times it is desirable to exchange user identity or persona information. For example, individuals and businesses may desire to exchange contact information for people, groups, organizations, businesses, households, or any other identifiable entity with which they interact. Such information may include, for example, a user's name, alias, telephone numbers, email addresses, instant messaging (IM) addresses, home address, web addresses, IP addresses for alternate deliver schemes, public keys, tokens, current projects, schedule availability, etc. Further, individuals or businesses may wish to have other user identity information distributed or published amid the community in which they interact such as hobbies, occupational specialties, affiliations, services provided, merchandise sold, etc.

Typically, in order for a user to utilize such identity or persona information, the user must manually input such information into, e.g., a contact management system. The user must then be able to understand, manage, and control the flow of persona information to other entities, i.e., people, organizations, etc. Today, however, there is no easy or consistent user experience around managing or sharing one's identity information. For example, each application and website has its own unique process for registering, storing, and using identity information. Accordingly, identity information is typically sprinkled throughout the distributed system, which makes the identity information difficult to find, update, or even know that the information exists. Further, even if the user knows where to find the identity information there is currently no easy, fine grained way to manage sharing the persona on a request-by-request basis.

For instance, a user may be able to create different files or cards for various types of identity information; for example, one for personal contact information, one for business contact information, one for legal identity information (e.g., credit cards, social security number, driver license, etc.), one for digital identities (e.g., tokens, public keys, certificates, etc.), and so on. Accordingly, a user may then select from the various types of identity stored when sharing such persona with other entities. If, however, the user does not wish to share a portion of identity information within a file, the user must either modify the identity card or create a new file for sharing.

While this process of modifying and/or creating a multitude of different identity types may work well for users with limited identity information, or for those who do not desire controlling their persona on a request-by-request basis, for other users there are still several shortcomings to this process. For example, if the user creates different cards or files for every possible combination of types of identity information, the number of permutations becomes extremely numerous requiring high memory and other valuable computing resources. Further, the user must take the time to create the different number of possible permutations and remember the contents of each identity file created for sharing the information with others; thereby diminishing the user experience. Accordingly, there exists a need for assisting a user in modifying identity information on a request-by-request basis in a user friendly way.

Another deficiency of current identity management systems is the difficulty or inability to determine those entities with whom a user has shared his/her persona. Often, a user desires to update or otherwise revoke identity information for various entities. Currently, however, there is no automated way to determine what identity information has been shared and with whom. As such, a user must rely on their own memory for determining what types of identities and with whom their persona has been shared with. As one can see, this reliance on the user's own memory makes it difficult (if not impossible) to know all of those entities and what type of identity information the user has shared.

In fact, the user might not even know that identity information has been shared. For example, websites that do not support a database backend might place cookies on one's machine (or elsewhere) in order to share identity information with the website each time it is visited by the user. This information is often controlled by the website and typically cannot be modified by the user—other than to delete the cookies. Further, the sharing of this information is typically transparent to the user such that the user may not even know the identity contents or that the identity information has been shared. Accordingly, there exists a need for being able to identify the entities for which specific types or items of identity have been shared in order to have better control and management over one's persona. A similar issue exists when the website uses a backend to store the identity information. In this case, the website places an identification key to the database in the cookie or asks the user to log into the website in order to access information stored in the web server database. The user, however, might not be aware of the information that s/he has shared with the site in the past.

Still another drawback of current identity management systems is that they do not provide the user with the ability to edit and store sensitive identity information in a secure environment. For example, each type and/or item of identity information is typically stored in an unencrypted format on the user's computer or in other databases. Accordingly, if a user leaves their computer on in an unlocked state, or if other rogue computers or software unintentionally installed by the user have access to the user's files and/or database, an unauthorized user may access, edit, or otherwise use the identity information in a harmful way. Accordingly, there also exists a need to be able to ensure that sensitive identity information is securely stored on the user's machine and/or in other databases.

BRIEF SUMMARY OF THE INVENTION

The above-identified deficiencies and drawbacks of current identity management systems are overcome through exemplary embodiments of the present invention. For example, the present invention provides for systems, methods, and computer program products for assisting a user in managing the user's shared persona on a request-by-request basis. More particularly, the present invention provides for automatically presenting the user with an interface through which the user can interact to select an amount of different identity information the user is willing to share with specified entities. Other example embodiments assist the user in managing identity information by providing the user with a visual list of entities for which the user has shared specified identity information. Still other example embodiments assist a user in managing identity information by automatically providing the user with the ability to update identity information shared upon editing the identity information.

In one embodiment, the present invention provides for receiving a request to share a user's identity information with one or more entities. The identity information includes available types of identity information such as the user's personal contact information, the user's business contact information, the user's legal information, or a digital identity for the user. Based on the request to share the user's identity information, this embodiment further provides for automatically displaying a user interface that includes a list of identity items corresponding to the one or more available types of identity information. Thereafter, user input is received that selects or deselects one or more identity items from the list of identity items for sharing a subset of the list of identity items with the one or more entities. Based on the user input, the subset of the list of identity items is sent to the one or more entities.

Other example embodiments provide for receiving a request for determining one or more entities for which one or more specified identity items from identity information about a user has been shared. The identity information including available types of identity information such as the user's personal contact information, the user's business contact information, the user's legal information, or a digital identity for the user. A log file that includes shared information about the entities is accessed for identifying which of the specified identity items have been shared. Based on the shared information about the one or more entities, a user interface is automatically generated that includes a list of the one or more entities for allowing the user to perform such tasks as revocation, updating, and other tasks associated with the identity information.

In yet another example embodiment, the present invention provides for receiving a request to edit a user's identity information, which includes available types of identity information such as a user's personal contact information, the user's business contact information, the user's legal information, or a digital identity. Thereafter, user input is received changing at least one identity item within the available types of identity information. Upon identifying that the at least one identity item has changed, a log is accessed for determining the entities that the at least one identity item was shared with. Based on the determined entities, the identity information on the one or more entities' computing devices is automatically updated in accordance with the changes from the user input.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a flow diagram of a method of assisting a user in managing the user's shared persona on a request-by-request basis in accordance with example embodiments;

FIG. 4 illustrates a flow diagram of a method of providing the user with a visual list of entities for which the user has shared specified identity information in accordance with example embodiments of the present invention;

FIG. 5 illustrates a flow diagram of a method of automatically providing the user the ability to update identity information shared upon editing the identity information in accordance with example embodiments.

DETAILED DESCRIPTION OF THE PREFERRED EMBODIMENTS

Figure 1:
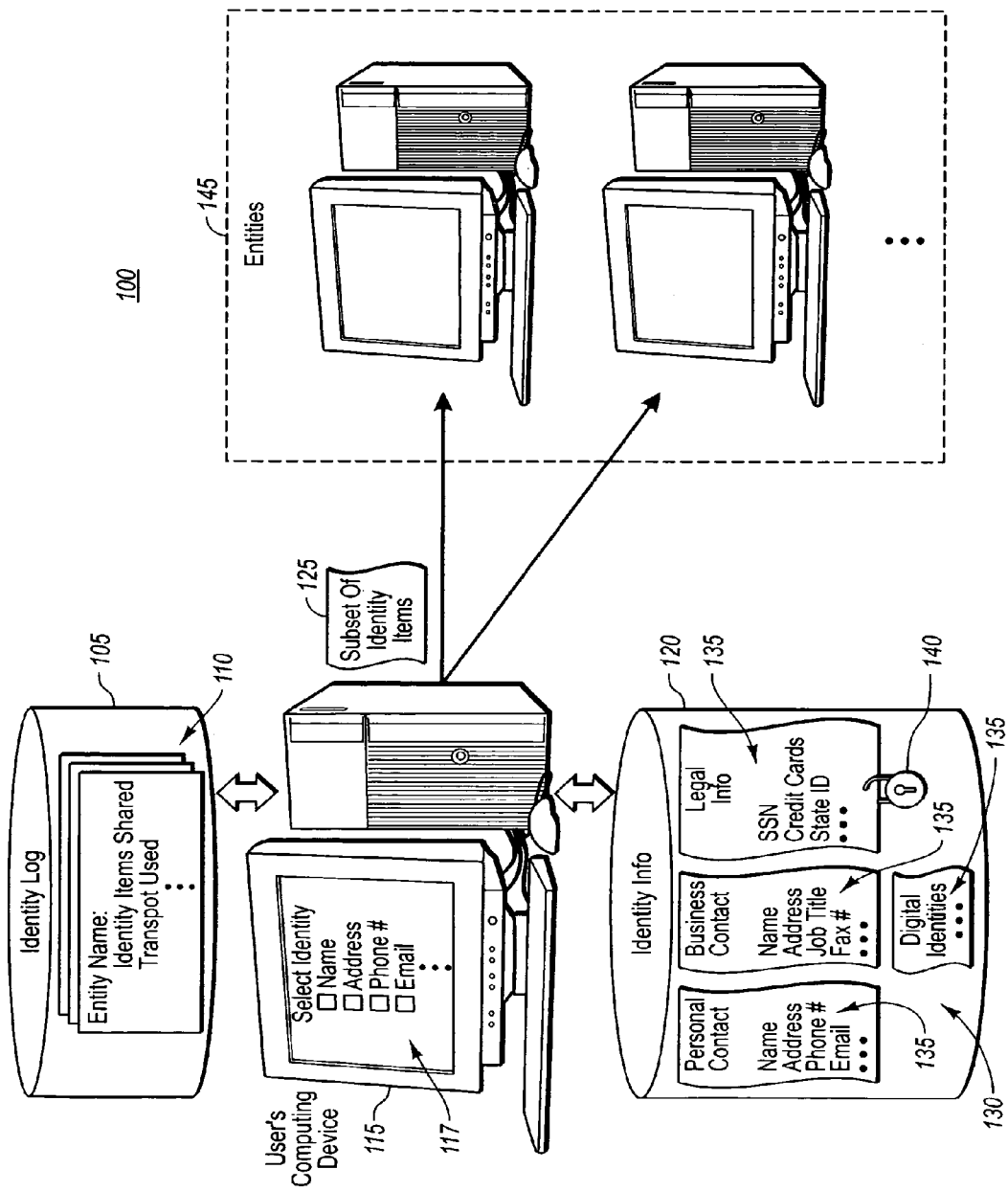
FIG. 1 illustrates a distributed system for assisting a user in managing the user's identity or persona information in accordance with example embodiments.

The present invention extends to methods, systems, and computer program products for managing a user's identity or persona information. The embodiments of the present invention may comprise a special purpose or general-purpose computer including various computer hardware components or modules, as discussed in greater detail below.

Prior to discussing various example embodiments of the present invention in great detail, it is useful to define terms that will be used consistently throughout the detailed description. First, the terms "identity information" or "persona" define various types of identity information that a user may exchange or share with other entities (e.g., people, corporations, computing devices, etc.). The "types of identity information" may include, but are not limited to, "personal contact information," "business contact information," "legal information," and/or "digital identities." Within each type of identity information are various "identity items" or "fields" that describe specific elements of the types of identity information.

For example, the personal contact information type—as the name implies—typically refers to personal information about a user. This identity type may include, but is not limited to, the following identity items: the user's name; the user's home address; various phone numbers for the user (e.g., home, cell, etc.); a personal email address for the user; an instant messaging (IM) address; and other similar information. Further, personal contact information may also include more personal identity items or fields, such as the user's birthday, likes, dislikes, a picture of the user, and other similar information.

Business contact information type, on the other hand, is more orientated around the type of business or industry the user may be associated with. For example, such information may include identity items such as a company name, company address, a job title or description, products sold or services rendered, business email, fax number for the business, various telephone numbers for the business, occupational specialties, affiliations, current projects, web addresses, and other similar business oriented items.

Legal information, as referred to herein, may include items or fields directed toward more sensitive subject matter that a user may be unwilling or uncomfortable to publicly share. Such information may include, but is not limited to, identity items such as the user's social security number, credit card numbers, state identification (e.g., driver's license, identification (ID) card, etc.), and other such information.

In contrast to the other types of identity information, digital identity types are more machine oriented ways of identifying the user or specific machines the user is associated with. Items within the digital identity type may include such things as tokens, public/private key pairs, certificates, and other machine readable identity fields.

With the above-identified definitions in mind, one example embodiment of the present invention provides for assisting a user in managing the user's shared persona on a request-by-request basis. Upon requesting to share one or more types of identity information, the user is automatically presented with an interface through which the user can interact in selecting an amount of identity items to share. A subset of the total identity items selected may then be shared with specified entities. In another embodiment, the present invention assists a user in managing identity information that has been shared with others by providing the user with a visual list of entities for which the user has shared specified identity information. The list may be generated based on the type of identity information, or based on a more granular level such as an identity item or field shared. Other embodiments of the present invention use shared information about an entity to automatically provide the user with the ability to update identity information that has subsequently been edited.

FIG. 1 illustrates a distributed system configured to implement various example embodiments described above. As shown, a distributed system 100 is provided that allows a user 115 to share identity information with various entities 145. A user's computing device 115 may receive a request to share identity information with the entities 145. Upon receiving the request, the identity information stored in store 120 may be accessed in order to determine the types 130 of identity information that are available to be shared. As shown, each type 130 of identity information (i.e., personal contact, business contact, legal information, and digital identities) may include various identity items 135 as described above. As will be described in greater detail below, these types 130 of identity information and items 135 within each type 130 are then used to present the user with a user interface for selecting the individual items 135 that are desired to be shared with the specified entities 145.

Note that although typically only one type 130 of identity information will be sent to the different entities 145, the present invention is not limited to a single type 130 or combination of items 135 within any specific type 130. For example, various items 135 from the legal information type 130 may be mixed within personal contact items 135 from the personal contact type 130 when, e.g., purchasing merchandise over the Internet. In fact, any of the various types 130 and items 135 within each type 130 may be mixed or matched depending upon the desires of the user, and possibly how a user defines his/her templates, as described in greater detail below with regards to FIGS. 2A-2C. Accordingly, the use of any specific type 130 of identity information and items 135 associated therewith for sharing, as described herein, are for illustrative purposes only and are not meant to limit or otherwise narrow the scope of the present invention unless explicitly claimed.

Regardless of the type 130 of identity information or particular items 135 within each type 130, upon requesting to share identity information example embodiments provide for automatically generating a user interface 117 that includes a list of identity items 135 for one or more types 130s of identity information. The user may then interact with the user interface 117 for choosing the identity items 135 that the user wishes to send to the entities 145. In particular, as described in greater detail below, the user may select or deselect each item 135 to produce a subset of identity items 125 that will be sent to the entities 145. Note that although the term "subset" was used to describe only a portion of the available identity information, the subset may include all the items 135 available. For example, the user may choose to select all available identity items 135 for one or more of the types 130 of identity information. As such, the term "subset," as defined herein, should be broadly construed to include all or a portion of all items 135 available in one or more types 130 of identity information.

In any event, this automated user interface 117 that assists the user in sharing items 135 of identity through an easily understandable selection and de-selection process advantageously enhances the user experience through ease in accessing and selecting items 135s of interest. In particular, because the user is able to select or deselect those items 135 of interest, there is no need to create and remember the contents of multiple types 130 of identity information. In addition, only a single template for each of the various types 130s of identity information is needed, thereby reducing memory and other computing requirements for exchanging identity information. Accordingly, the user is able to manage the distribution of the identity information on a request-by-request basis in an enhanced user experience, while preserving valuable computing system resources.

In another embodiment, note that various items 135 within each type 130 of identity information may be edited in a secure environment. For example, the user may have sensitive items 135 that the user feels uncomfortable or is unwilling to publicly distribute or share. In order to prevent unauthorized access to these items, the present invention provides a mechanism for securing, by password, smartcard, or another authentication method, the identity information. For instance, all or a portion of the legal type 130 of identity information may be considered sensitive. As such, the user may request that the information be secured by lock 140. In such instance, example embodiments will request at least a password (and possibly a user name), or some stronger authentication method, to protect 140 or otherwise encrypt the sensitive subject matter. Accordingly, in order to subsequently send or otherwise edit the information, the user will need to know the correct password or secret to decrypt the identity information.

Note that the password or secret may be a default value, such that the user does not need to enter a new password or secret for each item 135 or type 130 of identity information requested for securing 140. Further note that depending on where the identity information is stored and other computing capabilities, individual items 135 or complete types 130 may be secured. In addition, the encrypted identity information may be stored as a file locally in a well-known directory (e.g., in credential manager) or on a database that supports storing encrypted data in columns. Also note that other items 135 or types 130 of identity information other than the legal information type 130 may also be protected 140. Accordingly, any specific way of securing and storing the sensitive subject matter, or any specific item 135 or type 130 of identity information secured 140, are used herein for illustrative purposes only and are not meant to limit or otherwise narrow the scope of the present invention unless explicitly claimed.

The above described security feature advantageously protects sensitive identity information from unauthorized access. Accordingly, if the user leaves his/her computer on, in an unlocked state, or if others have access to folders where the sensitive subject matter is stored, unauthorized users will be unable to access the locked 140 identity information without the proper credentials.

In another example embodiment shown in FIG. 1, an identity log 105 is provided that can be used to identify entities 145 for which the user has shared the subset of identity items 125. For example, when the subset of identity items 125 are sent from the user's computing device 115 to the entities 145, various shared information 110 about the entities 145 and the subset of identity items 125 shared may be stored in identity log 105. Such shared information 110 may include, e.g., the entity name, the items 135, and/or the type 130 of identity information shared. Other information such as the transport used to share the identity information (e.g., HTTP (Hyper-Text Transport Protocol), FTP (File Transfer Protocol), SMTP (Simple Message Transfer Protocol), TCP (Transmission Control Protocol), UDP (User Datagram Protocol), SMS (Short Message Service), SNA (Systems Network Architecture), GPRS (General Packet Radio Service), or other transports), the address of the entities 145, and other useful shared information 110 can also be stored in identity log 105 for subsequent use. Accordingly, upon request, the user may receive a list of entities 145 and other shared information 110 regarding the identity information for which the user has shared.

For instance, the user may request a listing of entities 145 for which a specific identity item 135 or specific type 130 of identity information has been shared. Each shared information 110 file within the identity log 105 may then be scanned to determine those entities 145 for which the specific identity information was shared. A list of the entities 145, as well as other requested shared information 110, may then be presented in user interface 117.

Note that any subset of shared information 110 stored in the identity log 105 may be presented to the user for management purposes. In fact, the user may request the type 130 of identity information or items 135 shared for a specific entity 145. Accordingly, the use of any specific shared information 110 displayed or used, as described herein, is for illustrative purposes only and is not meant to limit or otherwise narrow the scope of the present invention unless explicitly claimed.

In another example embodiment, the shared information 110 within identity log 105 can be used to automatically update identity information shared with entities 145 upon editing the identity information shared. For example, user 115 may request to edit one or more items 135 from the types 130 of identity information. Upon editing and saving the identity information, the log 105 may be automatically scanned in determining those entities 145 that previously received the edited identity information. The appropriate shared information 110 for entities 145 that previously received the unedited identity information may then be used for updating the identity information on the entities' 145s' computing devices. For instance, upon receiving an indication that identity information has changed, user's computing device may scan log 105 for determining those entities for which the identity information was subsequently shared. The shared information 110 for each identity entity 145 may then be used to determine such information as the transport and address of an entity 145 to use in automatically updating the shared identity information for entities 145. Upon accessing the appropriate shared information 110, the user's computing device 115 can automatically update the corresponding entities' 145s' computing devices.

Note that as part of the automatic updating for edited identity information, the user may also be presented with a prompt or otherwise list of entities for which the user has shared the edited identity information. The user may then be prompted to select (or give some other appropriate indication of) those entities 145 in which the user would like the edited identity information updated. Note also that the identity log 105 and shared information 110 may be used for other functions other than just updating identity information. For example, in managing shared identity information a user may use the identity log 105, and the shared information 110 therein, to revoke specified identity information shared with entities 145. Accordingly, the manner in which the identity information is automatically updated and any specific use of the identity log 105—and shared information 110 therein—are for illustrative purposes only and are not meant to limit or otherwise narrow the scope of the present invention unless explicitly claimed.

Further note that access to the identity information on the entity 145 side may, or may not, be available in certain instances. For example, the user's computing device 115 may not be authorized to access the identity information on the entity 145 side or cannot identify a specific transport, address, and/or other shared information 110 used to update the entities 145. In such instance, other actions are also available to the present invention. For example, if the entities 145 have stored the identity information for the user in a database that is not accessible by the user's computing device 115, a message may be sent to the user, the entities 145, or both, indicating that the identity information has changed but is unavailable to be updated. As such, the identity information that has been edited may be sent in the message to the entities 145 allowing the entities 145 to update the information in a semi-manual process.

Of course, other notifications and processes for updating the edited information are also available to the present invention. Accordingly, the use of the term "automatic update" should be broadly construed to include all of the well-known ways of updating the identity information that has changed. Accordingly, any specific process or mechanism for updating the entities' 145s' computing devices are used for illustrative purposes only and are not meant to limit or otherwise narrow the scope of the present invention unless explicitly claimed.

Figure 2A:
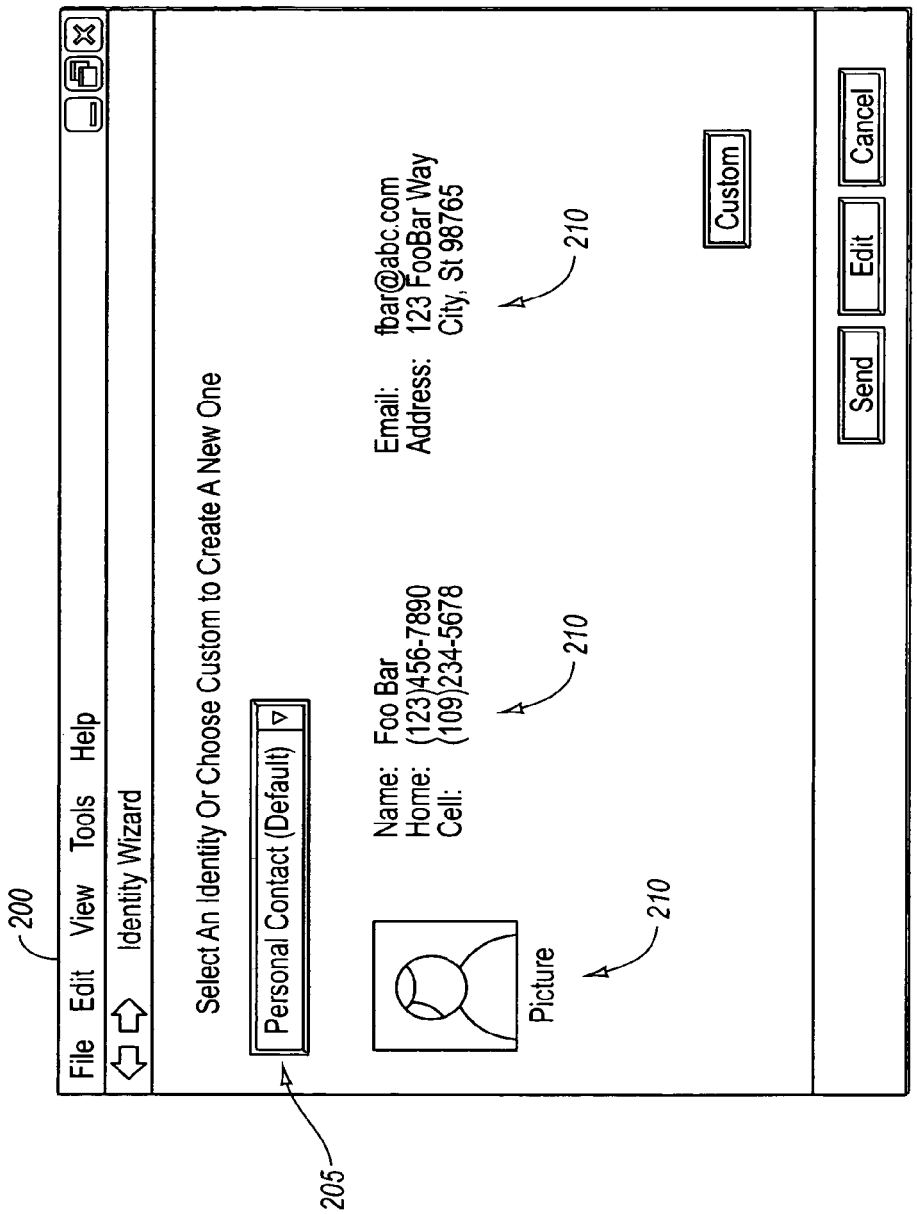
FIG. 2A illustrates a user interface showing a type of identity information that may be managed in accordance with example embodiments.
Figure 2B:
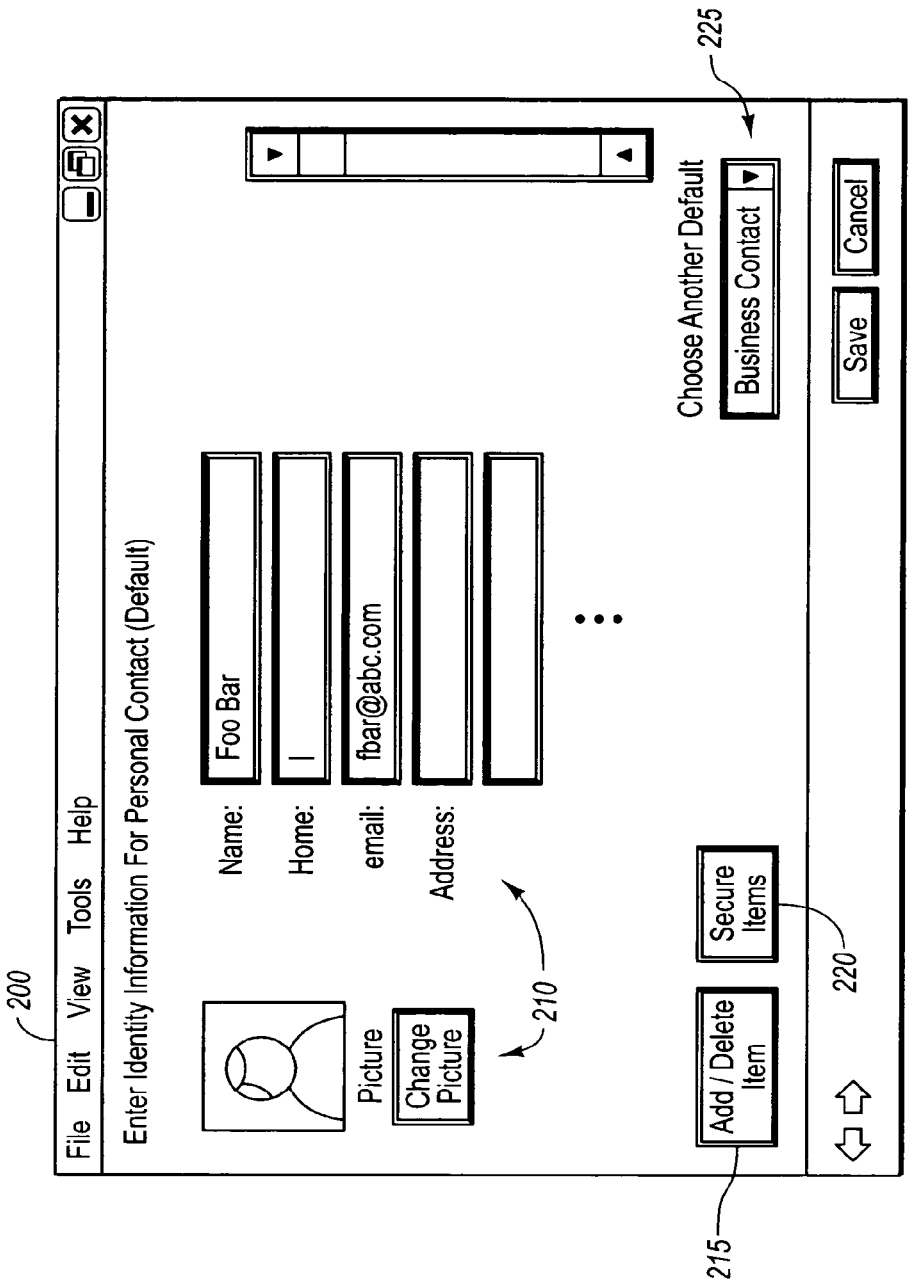
FIG. 2B illustrates a user interface for editing user identity information in accordance with example embodiments.
Figure 2C:
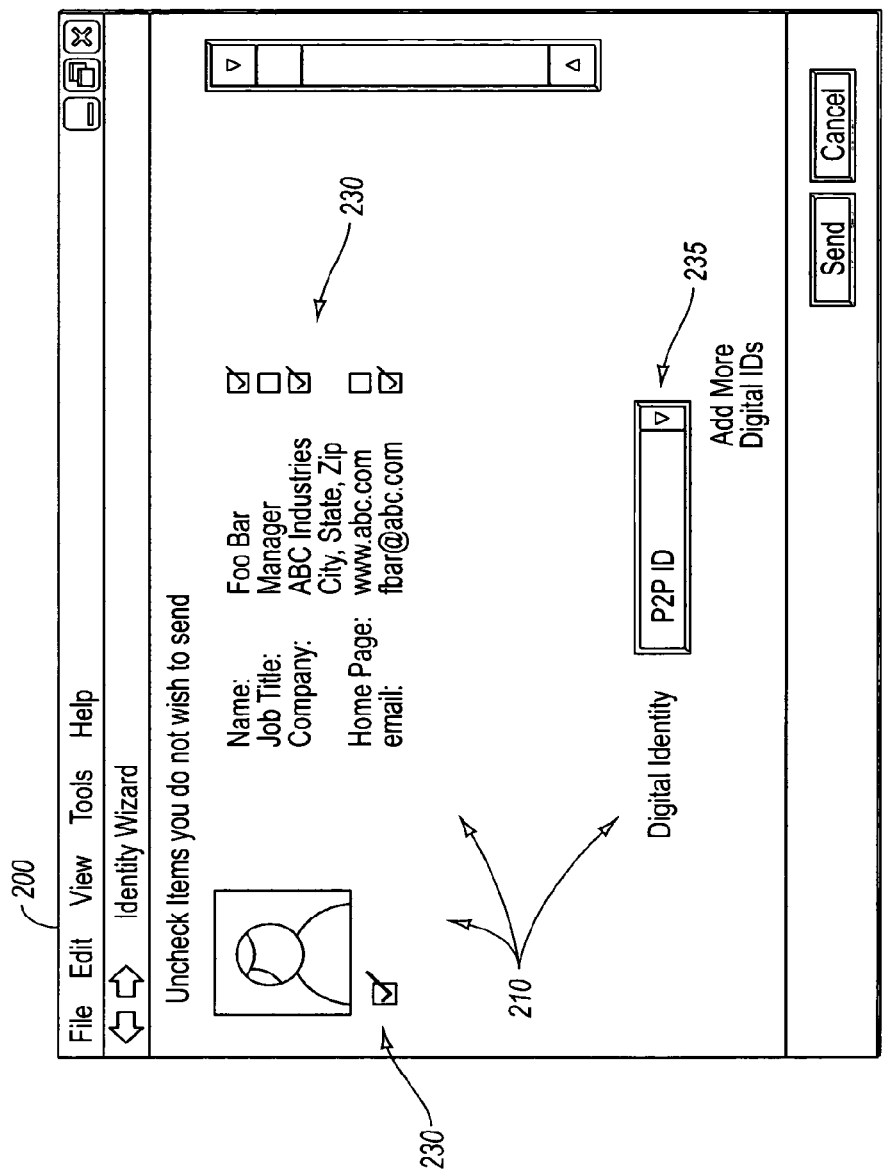
FIG. 2C illustrates a user interface for assisting a user in managing identity items on a request-by-request basis in accordance with example embodiments.

FIGS. 2A-2C illustrate various user interfaces, which can be used in practicing various embodiments described above. It should be noted that in each of the following user interfaces there are various designs, features, and objects for accomplishing one or more of the functions associated with the example embodiments of the present invention. There exists, however, numerous alternative user interface designs bearing different aesthetic aspects for accomplishing these functions. Accordingly, the aesthetic layout of the user interface for FIGS. 2A-2C—as well as the graphical objects described therein—are used for illustrative purposes only and are not meant to limit or otherwise narrow the scope of the present invention.

FIG. 2A illustrates a user interface 200 of an example personal contact type 205 displaying various identity items 210 as described above. Note that in this example the personal contact 205 is set as a default, which in one embodiment means that upon requesting to send identity information to various entities the personal contact type 205 will be the default template used. As shown, however, the identity wizard 200 may be used to set custom identity types and (as described below) choose other default types 205 to be used.

For example, as shown in FIG. 2B, a user can use interface 200 (i.e., identity wizard) to edit and enter identity information for a particular type (in this example, personal contact type). Various identity items 210 may be added and deleted using button 215 or otherwise edited in accordance with the user's desire. In addition, as shown, the user may use interface 200 to choose another default identity type 225. As previously noted, although a dropdown box is used to select other defaults 225 other graphical objects and aesthetic designs well known in the industry are also available to the present invention.

Further note that identity wizard 200 allows for securing items 210 using, e.g., secure items button 220. In such an event, as described above, individual identity items 210 or a whole identity type may be secured using a password or other secret and well known encryption methods. Such an advantageous feature is particularly useful in securing sensitive information that a user is unwilling or uncomfortable to share publicly, for example, the legal information as described herein. Accordingly, upon selecting secured items 220 a popup screen or other type of user interface can be presented to the user for selecting either individual items 210 or whole types to secure. Upon selection, the user may then be prompted for such things as user name, password, etc., for securing the desired identity information. Of course, as previously mentioned, the password and/or user name may be a default that is automatically selected without user input.

FIG. 2C illustrates an example of a user interface 200 that may be presented to the user when sharing identity information with other entities. Accordingly, upon requesting to share a type of identity information (in this example a business contact type) the user is presented with user interface 200 for choosing those identity items 210 that the user wishes to share. Note that in this example embodiment, the various identity items 210 may be selected or unselected as the user desires using check boxes 230. Further note that although check boxes 230 are used for selecting and deselecting identity items 210, other graphical interactive objects are also available to the present invention. For example, radio buttons, highlighting, or other objects or mechanisms to select and deselect items 210 are also available. Accordingly, as previously stated, other graphical objects and aesthetic designs well known in the industry are also available to the present invention.

Regardless of the aesthetic layout or objects used for selecting identity items 210, other example embodiments provide a mechanism for allowing the user to set a default or a template of selected identity items 210 that may be automatically selected (or unselected as the case may be) upon the request to share the identity information. Accordingly, the user may create a template selecting the various items within each type of identity information that is most commonly desired to be exchanged. As shown in this example, the user's name, company, email address, and picture have been selected as the default or template for sending identity information. Note, that the template may have been created in the edited user interface 200 from FIG. 2B, or any other subsequent or well-known ways to create such templates. Note that a digital identity 235 or other identity items and types may also be mixed with any other particular identity items or types as previously mentioned.

As will be appreciated, management of digital identity items in accordance with example embodiments described herein has several advantageous features. For example, a user may have certificates for access to a wireless or other network in business relationship that they may not want distributed among a wide variety of entities. Nevertheless, the user may wish to communicate with other entities over other mediums such as instant message, voice over IP, etc. As such, the entities they wish to communicate with need the appropriate digital identities in order to communicate with the user. As such, the user can choose those digital identity items that are appropriate for the type of communication desired. In fact, example embodiments support the selection and distribution of a plurality of different digital identity items. In this exemplary embodiment, the entities may be provided with a plurality of different digital identities that may be used to communicate with the user over a variety of mediums. This advantageously provides the entities with the continued attempt of using the different digital identities for determining the appropriate one to use in the specific communication; yet allows the user tighter management over how those digital identities are distributed to the various entities.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flowchart for FIGS. 2 and 3—is used to indicate the desired specific use of such terms.

FIGS. 3-5 illustrate flow diagrams for various exemplary embodiments of the present invention. The following description of FIGS. 3-5 will occasionally refer to corresponding elements from FIGS. 1 and 2A-2C. Although reference may be made to a specific element from these Figures, such elements are used for illustrative purposes only and are not meant to limit or otherwise narrow the scope of the present invention unless explicitly claimed.

FIG. 3 illustrates a method 300 of assisting a user in managing the user's shared persona on a request-by-request basis by automatically presenting the user with and interface through which the user can interact to select an amount of identity information that user is willing to share with a specified entity. Method 300 includes an act of receiving 305 a request to share a user's identity information with one or more entities. For example, the user's computer device 115 may receive a request to share the user's identity information with the one or more entities 145. The identity information 120 includes available types 130 of identity information such as a user's personal contact information, business contact information, legal information, or a digital identity for the user. In the event that the type 135 of identity information 120 is legal information, such legal information may be encrypted and the user would then need to enter a password, username, or both, to decrypt the legal information before being allowed to share the identity items for the legal information.

Based on the request to share the user's identity information, method 300 also includes an act of automatically displaying a user interface that includes a list of identity items. For example, after receiving the request, user's computer device 115 may display user interface 117 (or more specifically user interface 200 in FIG. 2C) that includes a list of identity items 135 corresponding to the available types 130 of identity information selected. The list of identity items 135 for the user's personal contact information may include a name, home address, telephone number, email address, birthday, likes, dislikes, picture, etc. The list of identity items 135 for the user's business contact information may include the user's name, a company name, a company address, email, fax number, telephone number, job title, products sold or services render, etc. The user's legal information, on the other hand, will typically include sensitive information that a user would be unwilling or uncomfortable to share publicly such as a credit card number, a social security number, a state identification number, etc.

After automatically displaying the list of identity items, method 300 includes an act of receiving user input that selects or deselects one or more identity items. For example, as shown in FIG. 2C, using user interface 200 a user can select or deselect the identity items 210 from the list of identity items for sharing a subset 125 of the list of identity items with entities 145. The list of identity items 210 may have a default setting or template selecting an automatic subset 125 of the list of identity items. This default settings or template may be created by the user at the time of creating the various types 130 of identity information.

Based on the user input, method 300 also includes an act of sending 325 the subset of the list of identity items to the one or more entities. For example, after receiving the user's selection of the identity items 135 to send, user's computing device 115 may send the subset of identity items 125 to the various entities 145.

Other exemplary embodiments provide that prior to automatically displaying the user interface 117, 200 that includes the list of identity items 135, 210 the above process may also present the user with a visual display of available types of 130 identity information the user can select from. Thereafter, user input may be received by selecting the types 130 of information for sharing with entities 145. Accordingly, the automatic display of user interface 117, 200 that includes a list of identity items 135, 210 may be further based on the selection of the types 130 of identity information.

Note that still other exemplary embodiments provide that if the available types 130 of identity information are the digital identity, such digital identity information may include a plurality of identity items 135 corresponding to different digital identities for the user/user's computing device 115. Accordingly, the user can select from various different digital identities for sharing with the entities 145.

FIG. 4 illustrates a method 400 of assisting a user in managing identity information shared with other entities by providing the user with a visual list of entities for which the user has shared specific identity information. Method 400 includes an act of receiving 405 a request for determining one or more entities for which one or more specified identity items from identity information about a user has been shared. For example, user's computing device 115 may receive a request for determining entities 145 for which specified identity items 135 from identity information about the user has been shared. As previously mentioned, the identity information 120 may include the available types of identity information 130 such as the user's personal contact information, the user's business contact information, the user's legal information, or a digital identity for the user. In addition, the specified identity items 135 for each of the types 130 of identity information may include any of those previously described and other well-known identity items.

Method 400 also includes an act of accessing 410 a log file that includes information about the one or more entities. For example, upon receiving the request described above, user's computing device 115 may access identity log 105, which includes shared information 110 about the entities 145 for which the specified identity items 135 have been shared. Based on the shared information about the entities, method 400 also includes an act of automatically generating 415 a user interface that includes a list of the one or more entities. For example, user's computing device 115 can access the shared information 110 about the entities 145 and automatically generate a user interface that includes the list of shared information 110 about the entities and other desired information. This list of entities 145 and shared information 110 may be used by the user to perform such tasks as revocation, updating, and other tasks associated with the identity information.

The user interface that includes the list of entities 145, as described above, may further be automatically generated based upon the user's request to update the identity items 135. Alternatively, or in conjunction, the user interface may be automatically generated based on the user's request to revoke the identity items 135 from the entities 145.

FIG. 5 illustrates a method 500 of assisting a user in managing identity information by automatically providing the user the ability to update identity information shared upon editing the identity information. Method 500 includes an act of receiving 505 a request to edit a user's identity information. For example, user's computing device 115 may receive a request to edit a user's identity information 120, which includes the types 130 of identity information such as the user's personal contact information, the user's contact business information, the user's legal information, or digital identity for the user. In the event that the type 130 of identity information is legal information, such legal information may be encrypted and the user would then need to enter a password, username, or both, to decrypt the legal information before being allowed to edit identity items for the legal information.

Method 500 also includes an act of receiving 510 user input changing at least one identity item within the one or more available types of identity information. Thereafter, method 500 further includes a step for automatically updating 530 the identity information on the entities' computing devices.

Step for 530 further includes the following acts: an act of identifying 515 that the at least one identity item has changed; an act of accessing 520 a log for determining one or more entities that the at least one identified item was shared with; and an act of sending 525 a request to update the identity information on the entities' computing devices in accordance with the changes from the user. For example, user's computing device 115 upon identifying that an identity item 135 has changed, may access identity log 105 for determining entities 145 that the identity item 135 was shared with. Thereafter, a request to update the identity information 120 on the entities' 145s' computing devices may be sent in accordance with the changes from the user.

Prior to the automatic updating of the identity information, the user may be presented with a prompt asking the user if the identity information should be updated on the entities' 145s' computing devices. In the event that the identity information cannot be automatically updated on the entities' 145s' computing devises due to access or other restrictions, a message may be sent to the user informing them of the restriction. A message may also be sent to the entities 145 indicating that the identity information has changed. Further, the message sent to the entities 145 can include the updated identity information for allowing the entities 145 to update the identity information in a semi-automated fashion.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
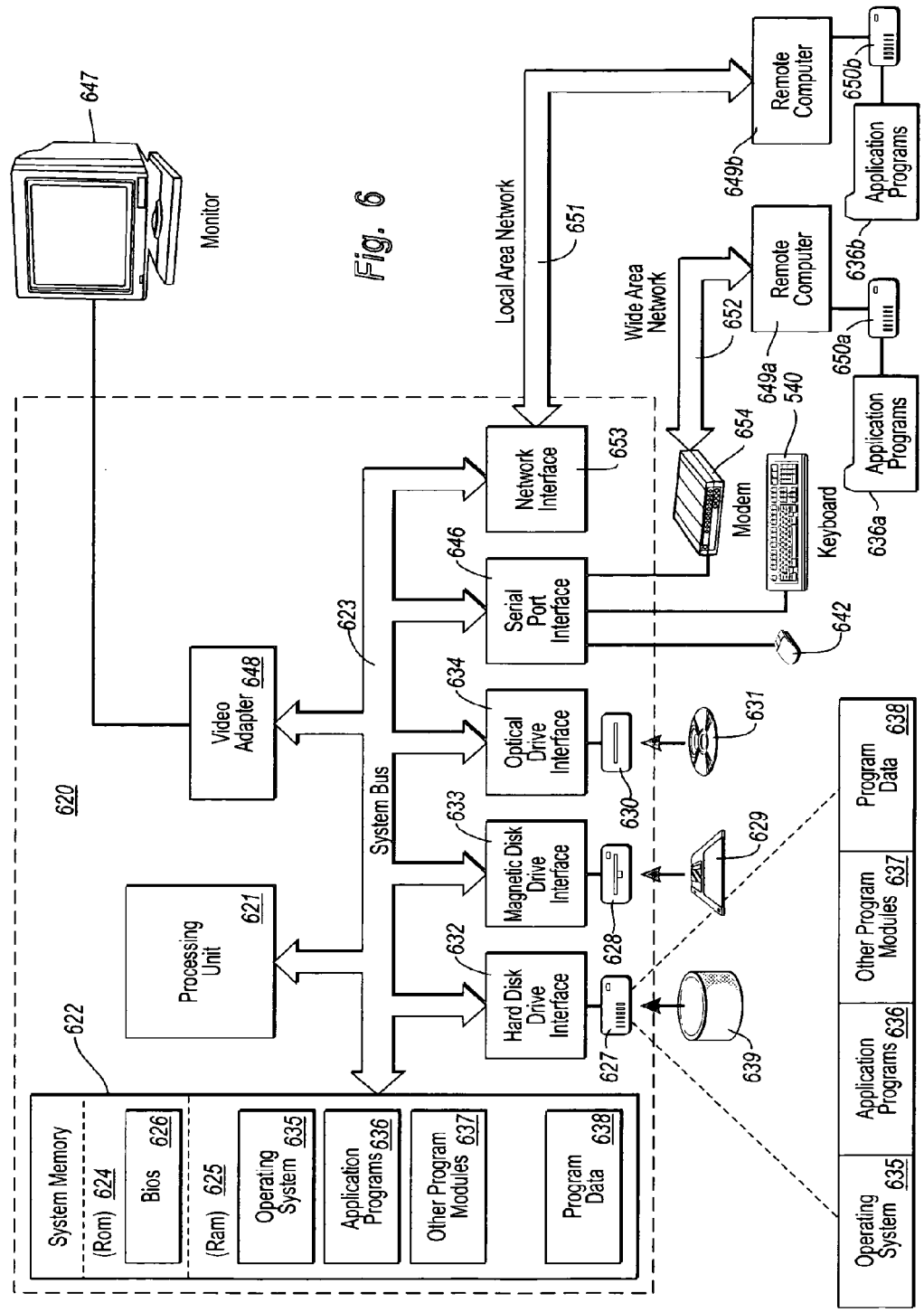
FIG. 6 illustrates an example system that provides a suitable operating environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 540, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for enabling a user to update their identity information that has been shared with one or more third parties, comprising:

an act of the computing system receiving a request from the user to update one or more specified identity information items with edited identity information, the computing system comprising at least one processor;

an act of the computing system receiving user input changing the at least one or more specified identity information items with the edited identity information;

an act of identifying that the at least one or more specified identity information items has changed;

an act of a computing system, in response to detecting that the one or more specified identity information items has changed, accessing a log file that identifies one or more different entities with whom the user has already shared the one or more specified identity information items;

an act of the computing system prompting the user whether the one or more specified identity information items should be updated with any of one or more of the different entities by at least displaying a list of the one or more different entities with whom the user has previously shared the one or more specified identity information items;

an act of the computing system receiving a user selection of at least one entity of the one or more different entities in the list to have the edited identity information sent to; and an act of the computing system sending the edited identity information to the at least one selected entity from the list.

2. The method recited in claim 1, wherein the method further includes:

displaying a list of the one or more identity information items and an item-by-item selection mechanism comprising interactive graphical objects, including at least one of check boxes, radio buttons or highlighting elements, by which each of the one or more identity information items is independently selectable and de-selectable, thereby allowing the user to, from the new user interface, select any combination of the one or more listed identity information items; and receiving a user selection of the one or more specified information identity items.

3. The method recited in claim 2, wherein the method further includes prompting the user for and receiving the edited identity information from the user.

4. The method recited in claim 2, wherein the new interface displays the one or more identity items next to corresponding contact information labels that describe or identify the one or more specified identity information items.

5. The method recited in claim 1, wherein the one or more identity information items includes a plurality of identity information items.

6. The method of claim 1, wherein the edited identity information cannot be used by at least one of the one or more entities' computing devices to automatically update one or more corresponding identity items stored at the at least one of the one or more entities' computing devices due to access restrictions, and wherein the method further includes sending a message to the user informing the user of the access restriction.

7. The method of claim 6, wherein the method also includes sending a different message to the at least one of the one or more entities' computing devices to indicate one or more specified identity information items have been updated.

8. The method of claim 7, wherein the different message includes the edited identity information.

9. A computer storage device having stored instructions which, when executed by a processor, implement a method for enabling a user to update their identity information that has been shared with one or more third parties, and wherein the method includes:

an act of the computing system receiving a request from the user to update one or more specified identity information items with edited identity information, the computing system comprising at least one processor;

an act of the computing system receiving user input changing the at least one or more specified identity information items with the edited identity information;

an act of identifying that the at least one or more specified identity information items has changed;

an act of a computing system, in response to detecting that the one or more specified identity information items has changed, accessing a log file that identifies one or more different entities with whom the user has already shared the one or more specified identity information items;

an act of the computing system prompting the user whether the one or more specified identity information items should be updated with any of one or more of the different entities by at least displaying a list of the one or more different entities with whom the user has previously shared the one or more specified identity information items;

an act of the computing system receiving a user selection of at least one entity of the one or more different entities in the list to have the edited identity information sent to; and an act of the computing system sending the edited identity information to the at least one selected entity from the list.

10. The computer storage device of claim 9, wherein the computer storage device includes system memory of the computing system.

11. The computer storage device of claim 9, wherein the method includes sending a message to at least one of the one or more entities' computing devices to indicate one or more specified identity information items have been updated.

12. The computer storage device of claim 9, wherein the method further includes:

displaying a list of the one or more identity information items and an item-by-item selection mechanism comprising interactive graphical objects, including at least one of check boxes, radio buttons or highlighting elements, by which each of the one or more identity information items is independently selectable and de-selectable, thereby allowing the user to, from the new user interface, select any combination of the one or more listed identity information items; and receiving a user selection of the one or more specified information identity items.

13. A computing system comprising:

one or more processor; and one or more hardware storage device having stored computer-executable instructions which, when executed by the one or more processor, implement a method for enabling the computing system to update a user's identity information that has been shared with one or more third parties, comprising:

an act of the computing system receiving a request from the user to update one or more specified identity information items with edited identity information, the computing system comprising at least one processor;

an act of the computing system receiving user input changing the at least one or more specified identity information items with the edited identity information;

an act of identifying that the at least one or more specified identity information items has changed;

an act of a computing system, in response to detecting that the one or more specified identity information items has changed, accessing a log file that identifies one or more different entities with whom the user has already shared the one or more specified identity information items;

an act of the computing system prompting the user whether the one or more specified identity information items should be updated with any of one or more of the different entities by at least displaying a list of the one or more different entities with whom the user has previously shared the one or more specified identity information items;

an act of the computing system receiving a user selection of at least one entity of the one or more different entities in the list to have the edited identity information sent to; and an act of the computing system sending the edited identity information to the at least one selected entity from the list.

14. The computing system recited in claim 13, wherein the method further includes:

displaying a list of the one or more identity information items and an item-by-item selection mechanism comprising interactive graphical objects, including at least one of check boxes, radio buttons or highlighting elements, by which each of the one or more identity information items is independently selectable and de-selectable, thereby allowing the user to, from the new user interface, select any combination of the one or more listed identity information items; and receiving a user selection of the one or more specified information identity items.

15. The computing system recited in claim 14, wherein the method further includes prompting the user for and receiving the edited identity information from the user.

16. The computing system recited in claim 14, wherein the new interface displays the one or more identity items next to corresponding contact information labels that describe or identify the one or more specified identity information items.

17. The computing system recited in claim 13, wherein the one or more identity information items includes a plurality of identity information items.

18. The computing system of claim 13, wherein the edited identity information cannot be used by at least one of the one or more entities' computing devices to automatically update one or more corresponding identity items stored at the at least one of the one or more entities' computing devices due to access restrictions, and wherein the method further includes sending a message to the user informing the user of the access restriction.

19. The computing system of claim 18, wherein the method also includes sending a different message to the at least one of the one or more entities' computing devices to indicate one or more specified identity information items have been updated.

20. The computing system of claim 19, wherein the different message includes the edited identity information.

* * * * *